United States Patent [19]

Griffin et al.

[11] Patent Number: 4,954,252

[45] Date of Patent: Sep. 4, 1990

[54] BIFLOW FILTER DRIER

[75] Inventors: Gary E. Griffin, Penn Yan; Walter O. Krause, Newark, both of N.Y.

[73] Assignee: Parker Hannifin Corporation, Cleveland, Ohio

[21] Appl. No.: 268,588

[22] Filed: Nov. 8, 1988

Related U.S. Application Data

[63] Continuation of Ser. No. 59,087, Jun. 8, 1987, abandoned.

[51] Int. Cl.⁵ .................... B01D 27/02; B01D 35/15
[52] U.S. Cl. ............................... 210/136; 55/387; 137/512.4; 137/856; 210/282; 210/287; 210/446
[58] Field of Search ................ 137/512.4, 856, 854, 137/855; 210/117, 136, 282, 287, 437, 446; 55/387, 389

[56] References Cited

U.S. PATENT DOCUMENTS

| | | | |
|---|---|---|---|
| 1,416,771 | 5/1922 | Babson et al. | 137/512.4 |
| 1,679,012 | 7/1928 | Wilson | 137/856 |
| 1,780,121 | 10/1930 | Dunning | 137/512.4 X |
| 1,892,711 | 1/1933 | Summers | 137/512.4 |
| 1,986,831 | 1/1935 | Le Valley | 137/512.4 |
| 2,019,747 | 11/1935 | Taylor | 137/856 X |
| 2,065,062 | 12/1936 | Dugelay | 137/512.4 X |
| 3,178,022 | 4/1965 | Balagh | 210/136 |
| 3,190,445 | 6/1965 | Rosaen | 210/117 |
| 3,200,838 | 8/1965 | Sheaffer | 137/856 X |
| 3,286,728 | 11/1966 | Stephenson | 137/856 |
| 3,289,841 | 12/1966 | Quinting | 210/136 X |
| 3,799,347 | 3/1974 | McDuffie | 210/136 X |
| 4,029,580 | 6/1977 | Lange | 210/136 |
| 4,082,295 | 4/1978 | Bainard | 137/856 X |
| 4,104,044 | 8/1978 | Lange | 210/136 X |
| 4,125,469 | 11/1978 | Henton et al. | 210/446 |
| 4,177,145 | 12/1979 | Schumacher | 210/136 |
| 4,192,751 | 3/1980 | Henton et al. | 210/136 |
| 4,227,901 | 10/1980 | Lange | 210/282 X |
| 4,257,458 | 3/1981 | Kondo et al. | 137/856 X |
| 4,318,809 | 3/1982 | Bethel | 210/117 |
| 4,320,000 | 3/1982 | Lange et al. | 210/117 |
| 4,437,490 | 3/1984 | Demers et al. | 137/512.4 |
| 4,573,888 | 3/1986 | Kitchin | 137/512.4 X |
| 4,696,263 | 9/1987 | Boyesen | 137/855 X |
| 4,708,606 | 11/1987 | Zambelli | 137/512.4 X |

FOREIGN PATENT DOCUMENTS 10287  3/1980  Japan .................... 210/136

Primary Examiner—Robert Spitzer
Attorney, Agent, or Firm—James A. Baker

[57] ABSTRACT

A biflow filter drier has a pair of flapper-type check valve assemblies for directing fluid flow unidirectionally through a centrally supported molded desiccant core. Each check valve assembly is a three part structure spot welded into a unitary assembly comprising a centering support plate, a core support cup and an intermediate flapper valve plate. Two flapper valves are formed from the valve plate and comprise the check valves covering valve openings in the suport plate and support cup. The material which formed the central opening in the support plate is bent at an angle to the support plate and provides an overtravel stop for the check valve. An angled surface of the core support cup provides an overtravel stop for the second check valve.

18 Claims, 3 Drawing Sheets

BIFLOW FILTER DRIER

This is a continuation of Ser. No. 059,087 filed on Jun. 8, 1987, now abandoned.

BACKGROUND OF THE INVENTION

This invention relates to filter driers and more particularly to a bidirectional flow filter drier which is especially useful in heat pump systems or any other air conditioning or refrigerant systems where fluid flows may be reversed.

Bidirectional flow filter drier assemblies are well known in these fields and provide convenient, economical devices which utilize a common filter drier medium and a minimum of interconnections with the plumbing of the systems which is advantageous both from the standpoints of minimal original equipment and ease of maintenance and repair.

Two examples of prior art devices are shown in U.S. Pat. No. 4,125,469. In both of these examples, a plurality of check valves are arranged in a typical bridge circuit configuration to provide unidirectional fluid flow through a common filter drier unit, all of the components being housed in a common enclosure. In one example, four flapper valves are used to form the flow circuit while in the other example, each of the two duplicate valve assemblies is formed of a flapper valve and poppet valve combination.

Another example of prior art device is shown in U.S. Pat. No. 4,320,000 wherein four floating disc check valves are employed to provide unidirectional fluid flow through a molded desiccant core structure, also in a common enclosure.

Still another form of prior art device is shown in U.S. Pat. No. 4,177,145. In this unit, each valve assembly at either end of the common enclosure consists of an elastomeric or diaphragm type valve and spring-loaded ball, poppet type valve combination.

While these prior art devices are suitable for many purposes each of them is a fairly complex structure having a rather high number of components which introduce many assembly considerations and which increase the failure rate of the overall unit. Some of these devices require fairly difficult riveting or staking techniques or the placement of coil springs during assembly which adds to the complexity of the unit.

One of the objects of this invention is to provide a simplified and reliable biflow filter drier structure which utilizes a minimal number of components.

Another object of this invention is to provide valving structure which is easily fabricated from punched metal parts and readily assembled by spot welding technique.

Still another object of this invention is to provide an axial flow filter drier which utilizes a pair of identical check valve assemblies and a single molded desiccant core and in which the check valves are stainless steel reed type flapper valves formed from a single sheet of material.

SUMMARY OF THE INVENTION

These and other objects are attained in the apparatus of this invention which comprises a tubular housing having a pair of end caps, each with a flow port fitting, containing a pair of identical check valve assemblies which support a central molded desiccant core. Each check valve structure is a spot welded assembly of a centering plate, a core support cup and an intermediate flapper valve plate. The valve plate incldues a pair of flapper reeds extending in opposite directions from a central support surface and normally covering a central valve opening in the core support cup, and an offset opening in the centering plate. The valves are moved to open positions by fluid pressures and are prevented from overtravel and overstressing by stop surfaces on both the core support cup and the centering plate. The flapper valve members are formed from a single thin sheet of metal and stainless steel is preferable for this application.

DESCRIPTION OF THE PREFERRED EMBODIMENT

Figure 1:
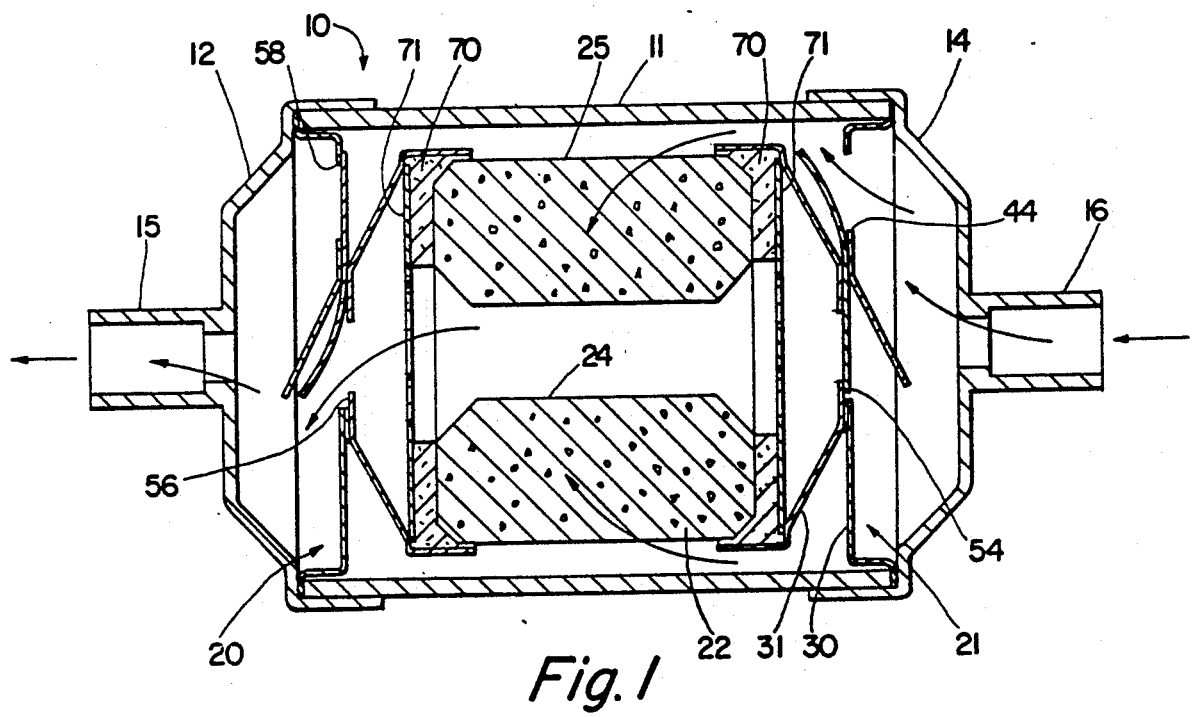
FIG. 1 is a sectional view of the filter drier of the invention showing the valves therein in a reverse flow condition.
Figure 2:
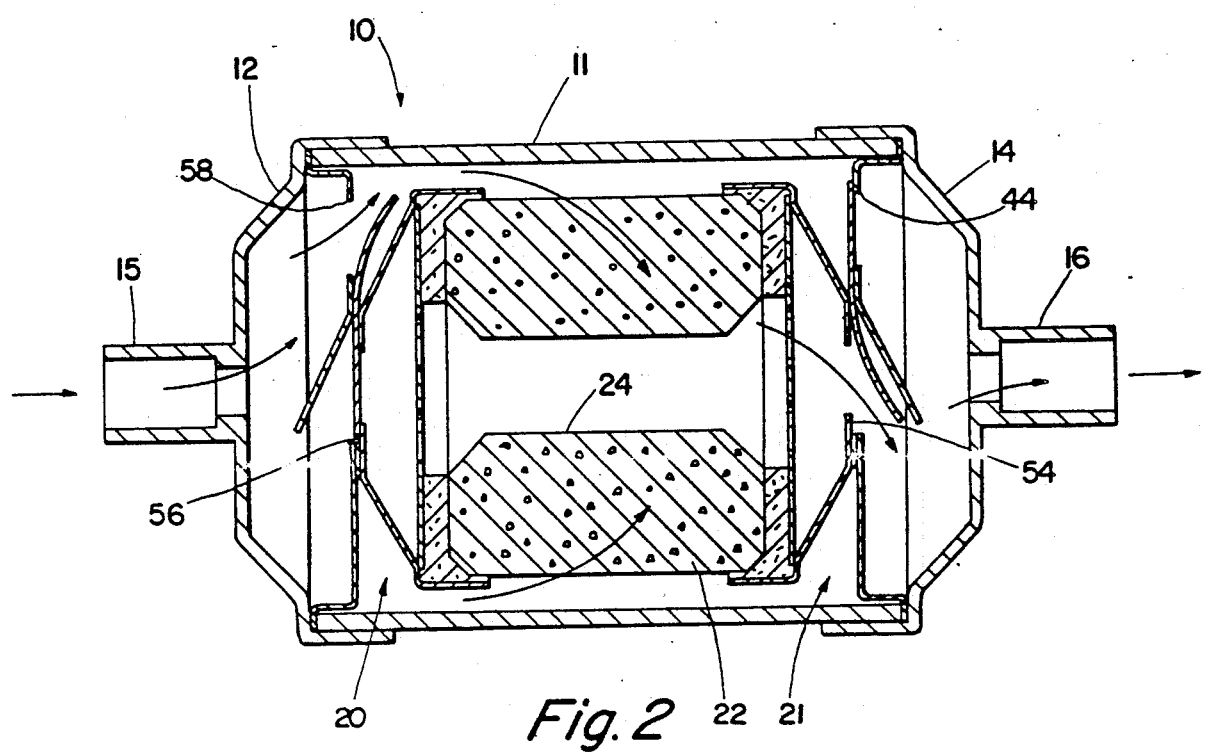
FIG. 2 is a sectional view of the filter drier of the invention showing the valves therein in a forward flow condition.

Referring now to FIGS. 1 and 2 there is shown the filter drier 10 of the invention in the operating modes of reverse fluid flow in FIG. 1 and forward fluid flow as depicted in FIG. 2, for a conventional heat pump systems or the like. The filter drier 10 comprises tubular casing 11 having first and second ends at which end caps 12, 14 are positioned. End caps 12, 14 are closure members for tubular casing 11 and each respectively includes a fluid flow port 15, 16. In this embodiment of the invention the fluid flow ports 15, 16 are depicted as short tubular stubs centrally positioned in end caps 12, 14 and located substantially on the central axis of casing 11. End caps 12, 14 and flow ports 15, 16 may comprise separate structures but typically are brazed to one another and to casing 11 to form an integral housing structure. Flow ports 15, 16 may be joined to interconnecting conduits of a typical heat pump system by a soldered connection or by another convenient joining technique.

Located within casing 11 are first and second valve assemblies 20, 21 and porous molded desiccant core 22 which is supported between valve assemblies 20, 21. Molded desiccant core 22 is a rigid, but porous cylindrical structure having a central longitudinal bore 24 therein with slightly outwardly flared ends and is preferably formed of activated alumina and molecular sieve with a phosphate bond, although many other materials would be suitable. Core 22 includes an outer peripheral cylindrical surface 25 and is adapted in this embodiment of the invention for unidirectional fluid flow through core 22 from outer surface 25 to central bore 24.

Figure 9:
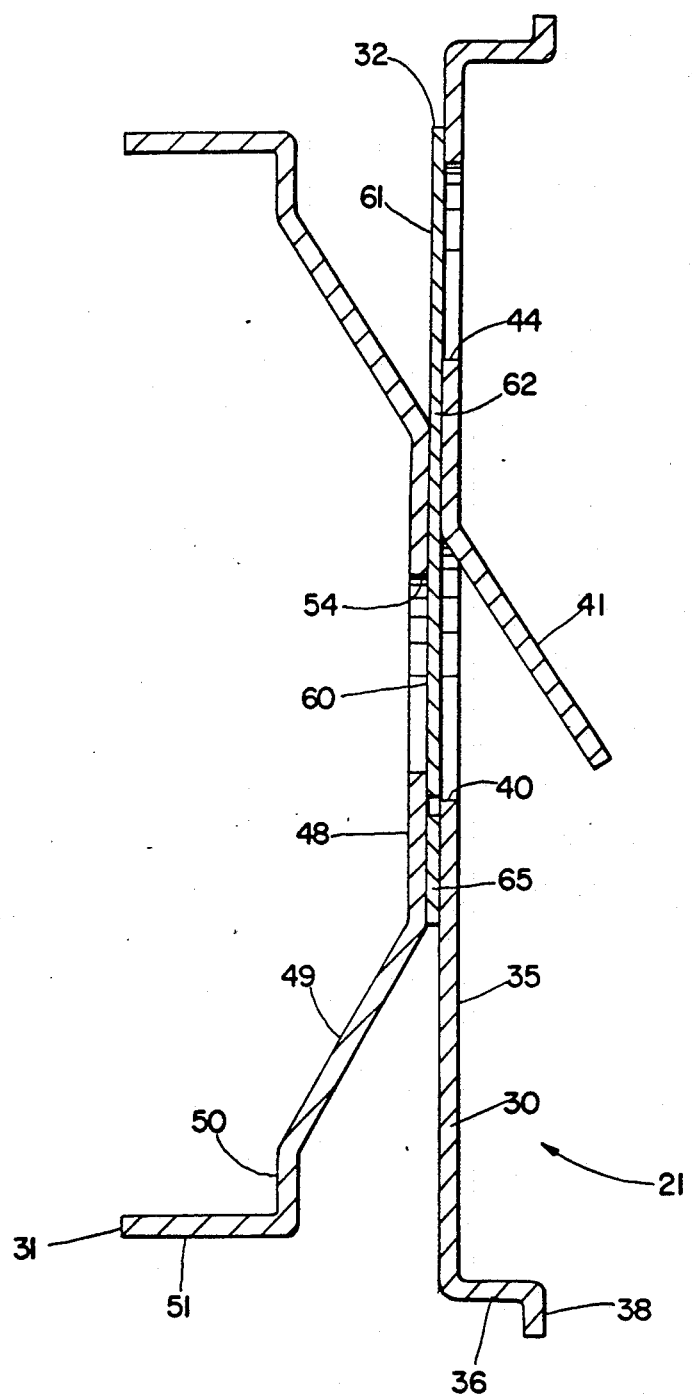
FIG. 9 is an enlarged sectional view of the flapper valve assembly shown in FIG. 4.

Each valve assembly 20, 21 is identical but positioned reversely in casing 11 to direct fluid flow in the manner depicted by arrows in FIGS. 1 and 2. Only valve assembly 21 will be described in detail and it will be understood that valve assembly 20 comprises an identical construction. Referring more particularly to the enlarged view of FIG. 9 it will be seen that valve assembly 21 comprises only three coponents consisting of centering support plate 30, core support cup 31 and flapper valve plate 32. In the view of FIG. 9 valve assembly 21 is shown in the as-assembled, normally closed condition, while in FIGS. 1 and 2, valve assemblies 20, 21 are shown as subject to fluid flow.

Figure 3:
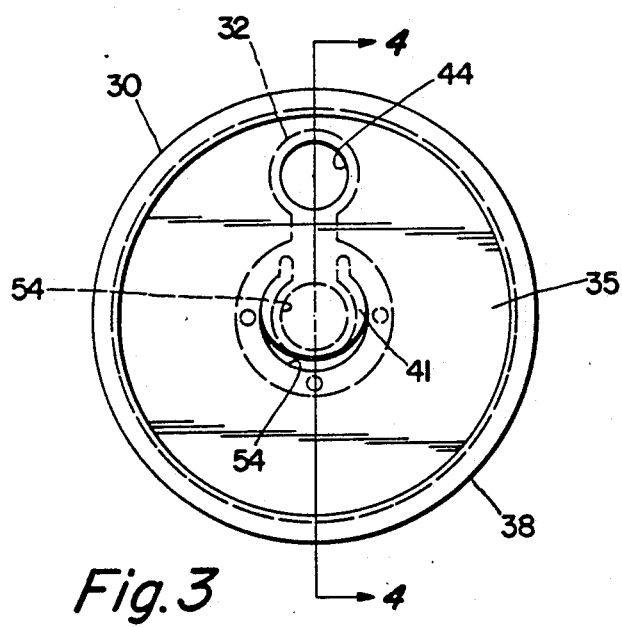
FIG. 3 is an end view of one of the flapper valve assemblies.
Figure 4:
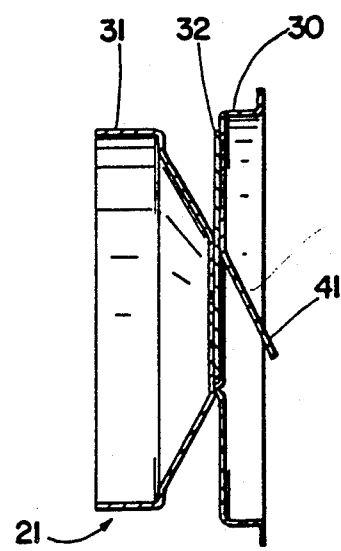
FIG. 4 is a sectional view of the flapper valve assembly of FIG. 3, taken along the lines 4—4.

With reference also to FIGS. 3 and 4, centering support plate 30 consists of a circular disk shaped member having a flat bottom wall 35, cylindrical peripheral side wall 36 and outwardly directed annular flange 38. Support plate 30 is formed as a simple stamping, typically of steel and may be formed of sheet material on the order of 0.024 inch thickness, and having an overall diameter on the order of 2.5 inches. Support plate 30 further includes a generally circular central opening 40 which is formed by punching and partially severing a flap 41 of material which is left angled with respect to the plane of bottom wall 35 at an angle of approximately 25°. As will be described in greater detail hereafter, flap 41 serves as an overtravel stop for one of the check valves of valve assembly 21. A further offset opening 44 is provided in bottom wall 35 of support plate 30, being positioned about midway between central opening 40, and side wall 36. The periphery of offset opening 44 is the valve seat for one of the check valves of valve assembly 21.

Figure 5:
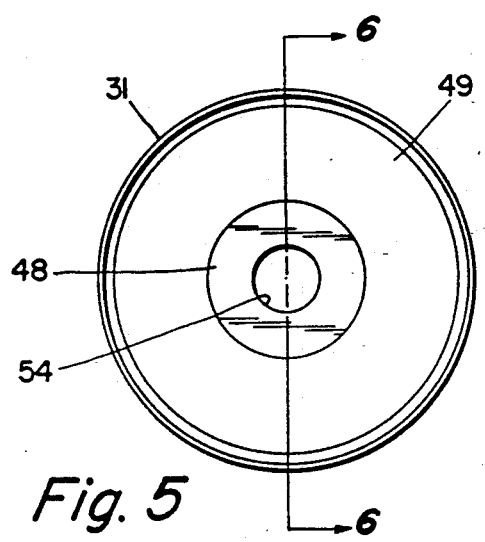
FIG. 5 is an end view of the core support cup forming one part of the flapper valve assembly.
Figure 6:
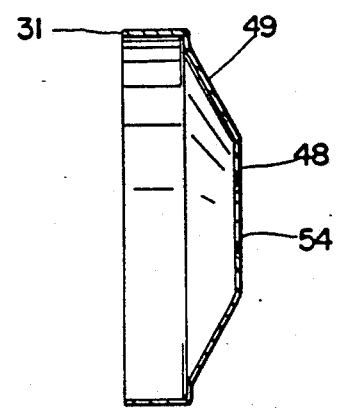
FIG. 6 is a sectional view of the core support cup of FIG. 5, taken along the lines 6—6.

With reference as well to FIGS. 5 and 6, core support cup 31 is a circular cup-shaped member having a central flat bottom wall 48, conical intermediate wall 49, flat annular shelf 50 and cylindrical outer wall 51. Support cup 31 further includes central circular opening 54 in bottom wall 48, the periphery of which is a valve seat for one of the check valves of valve assembly 21. Conical wall 49 is angled relative to bottom wall 48 at an angle of about 28° and serves as the overtravel stop for one of the check valves of valve assembly 21. Core support cup 31 is also formed of thin steel sheet on the order of 0.024 inch thickness.

Figure 7:
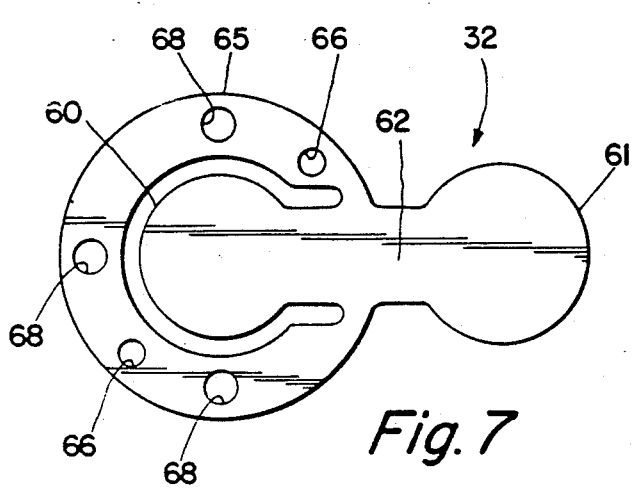
FIG. 7 is a plan view of the flapper valve portion of the flapper valve assembly.

Valve assembly 21 is completed by flapper valve plate 32 which also is a thin plate and which is sandwiched between support plate 30 and support cup 31. With reference also to FIG. 7, flapper valve plate 32 is preferably a stainless steel, sheet metal stamping, on the order of 0.003 inch thickness and consists essentially of first flapper valve 60, second flapper valve 61 and intermediate support section 62. Flapper valves 60, 61 extend in opposite directions from central support section 62 in the form of reed valves and in this embodiment of the invention have generally circular distal ends sized to adequately cover associated valve seat openings. As best seen in FIG. 9, first flapper valve 60 is disposed adjacent opening 54 of support cup 31 and second flapper valve 61 is disposed adjacent offset opening 44 of support plate 30. Flapper plate 32 further comprises annular support section 65 which is an extension of intermediate support section 62 and which surrounds first flapper valve 60. Annular support section 65 includes a pair of diametrically opposite locating holes 66 and three further holes 68 spaced at 90° intervals, which receive weld projections for securing support plate 30 and support cup 31 by spot welds. Flapper valve plate 32 could be formed of other materials as well, such as Teflon or the like, and the entire assembly joined by staking rather than spot welds, which would avoid heat distortion effects.

With support section 62 and annular support section 65 in firm engagement therebetween, support plate 30 and the bottom wall 48 of support cup 31 are positioned in substantially parallel, close engagement with flapper valves 60, 61 covering the respective valve seat openings 54, 44, thereby forming a pair of check valves. Since the material of flapper valve plate 32 is so thin and flexible flapper valves 60, 61 are able to flex away from their respective valve seat openings 54, 44 under the urging of fluid flow to allow flow in one direction, but to prevent flow in the opposite direction where the valves are further urged against their respective valves seats. Flapper valve 60 may be moved to an open position away from opening 54 but is limited from over-flexing by overtravel stop 41. Similarly, flapper valve 61 may be moved to an open position away from opening 44 but is limited from overflexing by conical wall 49 of support cup 31, both conditions being depicted in FIGS. 1 and 2. In this embodiment of the invention, central valve seat opening 54 is on the order of 0.5 inch diameter, while offset valve seat opening 44 is on the order of 0.375 inch diameter.

Figure 8:
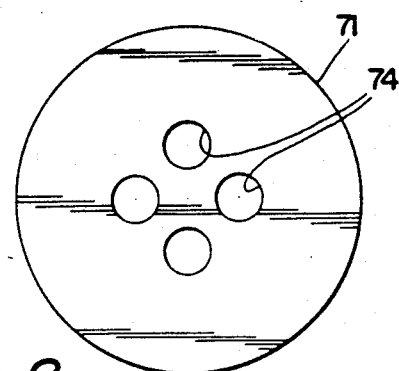
FIG. 8 is a plan view of a perforated plate supported at either end of the desiccant core.

The valve assemblies 20, 21 thus comprise rigid support members, each with a pair of check valves therein and are supported in casing 11 by the placement of flanges 38 between the ends of casing 11 and respective end caps 12, 14 and permanently securing the structure by brazing end caps 12, 14 to casing 11. Supported in the facing support cups 31 of the valve assemblies 20, 21 is molded desiccant core 22 which includes at either end an annular ceramic gasket 70 and circular perforated plate 71. Perforated plate 71 is seen in plan view of FIG. 8 as comprising a disk having a plurality of apertures 74 at the center thereof and which together with gasket 70 prevents flow of fluid through the ends of core 22, and allows flow through center bore 24.

Thus, with reference to FIG. 1 it may be seen that under reverse flow conditions, that is, where fluid pressure is higher at port 16 than at port 15, flow would occur as depicted by the arrows through the offset valve seat 44 of valve assembly 21, molded desiccant core 22, the center valve seat 56 of valve assembly 20 and out port 15. Under these conditions, the center valve seat 54 of valve assembly 21 and the offset valve seat 58 of valve assembly 20 would be in the normally closed condition and would be further urged to the closed condition by the fluid flow.

In the forward flow direction as seen by the arrows in FIG. 2, flow enters port 15, then passes through the offset valve seat 58 of valve assembly 20, molded desiccant core 32, the center valve seat 54 of valve assembly 21 and out port 16. Under these conditions, the center valve seat 56 of valve assembly 20 and the offset valve seat 44 of valve assembly 21 would be closed and firmly urged to the closed position by the fluid flow. In both the forward and reverse flow situations fluid flow passes from the periphery 25 of molded desiccant core 22 to the central bore 24 in a unidirectional manner so that core 22 may serve both functions.

We claim:
1. A bidirectional filter drier, comprising
   a casing having opposed ends,
   closure means at said opposed ends,
   a flow port in each of said closure means, first and second check valve assemblies supported in said casing at said opposed ends, and filter drier means supported by and between said valve assemblies, each said check valve assembly comprising first and second supports respectively having first and second openings therein, and a valve plate disposed between said first and second supports, said valve plate having first and second flapper valves respectively disposed adjacent said first and second openings normally to close said openings, said flapper valves being movable in opposite directions away from said respective openings in response to fluid flow in respective opposite directions through said drier, said second opening in each said second support being centrally located, and said filter drier means including a tubular core of desiccant material having a central passage communicating with and extending between said centrally located second openings in said second supports, and wherein said first support is a centering plate having a central opening, said first opening is offset from said central opening, said second support is a core support cup having a flat bottom wall and a conical sidewall, said centrally located second opening is located in said bottom wall, said valve plate has an annular support portion surrounding said second flapper valve adjacent said second opening, and said support portion is sandwiched between said support cup bottom wall and said centering plate to maintain the same in spaced apart parallel relationship.

2. A filter drier as set forth in claim 1, wherein said first openings in said first supports are offset from the centrally located second openings in said second supports, and said first support in each check valve assembly has a central opening adjacent the centrally located opening of said second support.

3. A filter drier as set forth in claim 2, wherein both said first and second supports include flapper valve overtravel means thereon for limiting the movement of said flapper valves.

4. A filter drier as set forth in claim 3, wherein said overtravel means of said first support is an angled flap of material partly severed from said first support to form said central opening therein.

5. A filter drier as set forth in claim 1, wherein said first flapper valve extends radially outwardly from said annular support portion.

6. A filter drier as set forth in claim 1, wherein said centering plate has an outwardly angled central flap for limiting outward movement of said second flapper valve.

7. A filter drier as set forth in claim 6, wherein said central flap is formed by material punched to form said central opening.

8. A dual flapper check valve assembly for controlling fluid flow in forward and reverse directions, comprising a first plate having a first opening therein, a second plate having a second valve opening therein, a valve plate sandwiched between and secured to said first and second plates, said valve plate including first and second flapper valve portions and a support portion joining said flapper valve portions, said first and second flapper valve portions normally overlying and closing said first and second valve openings, respectively, said first and second flapper valve portions being movable in opposite directions away from said valve openings in response to fluid flows in respective opposite directions through said valve assembly, and said support portion including at least one aperture through which said first and second plates are integrally joined to one another to form a unitary assembly.

9. A check valve assembly as set forth in claim 8, wherein said first and second plates are integrally joined by spot welding through said aperture in said support member.

10. A check valve assembly as set forth in claim 8, wherein said first and second plates are integrally joined by staking through said aperture in said support member.

11. A check valve assembly as set forth in claim 8, wherein said support portion surrounds said second flapper valve portion.

12. A check valve assembly as set forth in claim 11, wherein said support portion includes plural apertures circumferentially arranged around said second flapper valve portion and through which said first and second plates are integrally joined.

13. A check valve assembly as set forth in claim 8, wherein said first plate includes a valve overtravel stop member positioned adjacent said second valve opening for limiting movement of said second flapper valve.

14. A check valve assembly as set forth in claim 13, wherein said second plate includes a valve overtravel stop member positioned adjacent said first valve opening for limiting movement of said first flapper valve.

15. A check valve assembly as set forth in claim 14, wherein both said valve overtravel stop members are angled surfaces of said first and second plates, respectively.

16. A check valve assembly as set forth in claim 15, wherein said first plate has a central opening therein aligned with said second valve opening and said valve overtravel stop member of said first plate is formed by material of said first plate which has been partially severed to form said central opening.

17. A check valve assembly as set forth in claim 8, wherein said first and second plates are sheet metal stampings.

18. A dual flapper check valve assembly for controlling fluid flow in forward and reverse directions, comprising a first plate having a first valve opening therein, a second plate having a second valve opening therein, a valve plate sandwiched between and secured to said first and second plates, said valve plate comprising first and second flapper valves and a support member between said flapper valves, said support member spacing said plates to position said first flapper valve adjacent said first valve opening in a normally valve closed condition and said second flapper valve adjacent said second valve opening in a normally closed valve condition, said flapper valves being coplanar in the normally closed condition and movable in opposite directions away from said valve openings in response to fluid flows in respective opposite directions through said valve assembly, and a valve overtravel stop member positioned adjacent said second valve opening for limiting movement of said second flapper valve, said first plate having an aperture aligned with said second valve opening, and said valve overtravel stop member being an angled flap of material partly severed from said first plate to form said aperture therein.

* * * * *